United States Patent [19]

Iwamoto

[11] Patent Number: 4,960,480
[45] Date of Patent: Oct. 2, 1990

[54] METHOD OF AND SYSTEM FOR ASSEMBLING MAGNETIC DISK CARTRIDGE

[75] Inventor: Shoji Iwamoto, Kanagawa, Japan

[73] Assignee: Fuji Photo Film Co., Ltd., Kanagawa, Japan

[21] Appl. No.: 320,654

[22] Filed: Mar. 8, 1989

[30] Foreign Application Priority Data

Mar. 8, 1988 [JP] Japan .................................. 63-54615

[51] Int. Cl.⁵ ............................................ B32B 31/18
[52] U.S. Cl. .................................. 156/256; 156/517; 156/521; 156/556; 156/DIG. 36; 156/DIG. 51; 360/133
[58] Field of Search ............... 156/256, 517, 521, 556, 156/DIG. 36, DIG. 51; 360/133, 135

[56] References Cited

U.S. PATENT DOCUMENTS

| | | | |
|---|---|---|---|
| 2,279,724 | 4/1942 | Von Hofe | 156/DIG. 36 |
| 2,524,945 | 10/1950 | Von Hofe | 156/DIG. 36 |
| 2,651,429 | 9/1953 | Von Hofe | 156/DIG. 36 |
| 2,684,775 | 7/1954 | Von Hofe | 156/DIG. 36 |
| 3,887,414 | 6/1975 | Cohn | 156/521 |
| 4,104,109 | 8/1978 | Grau et al. | 156/521 |
| 4,757,412 | 7/1988 | Iizuka et al. | 360/133 |
| 4,768,123 | 8/1988 | Iizuka et al. | 360/133 |

*Primary Examiner*—Caleb Weston
*Attorney, Agent, or Firm*—Sughrue, Mion, Zinn, MacPeak & Seas

[57] ABSTRACT

In a magnetic disk cartridge, a magnetic disk sheet is accommodated in a casing in such a way that it may be rotated. A heat-sensitive adhesive is provided on one side of a raw sheet material composed of the same material as wear-resistant members which are to be bonded to the casing. The raw sheet material is cut into wear-resistant members and each of the wear-resistant members is heated in order to melt the heat-sensitive adhesive while the wear-resistant member is supported with a suction force. Then the wear-resistant member is released while the heat-sensitive adhesive is in a molten state, and it is pressed against the central portion of the inner surface of the casing. Thus the casing has a wear-resistant member bonded to a central portion of the inner surface of the casing.

2 Claims, 2 Drawing Sheets

METHOD OF AND SYSTEM FOR ASSEMBLING MAGNETIC DISK CARTRIDGE

BACKGROUND OF THE INVENTION

1. Field of the Invention

This invention relates to a method of and a system for assembling a magnetic disk cartridge comprising a magnetic disk sheet accommodated in a casing in such a way that it may be rotated, and more particularly to a method of and a system for assembling a magnetic disk cartridge having a wear-resistant member bonded to a central portion of the inner surface of the casing.

2. Description of the Prior Art

As is well known, the magnetic disk sheet of a magnetic disk cartridge has a center core, and is supported by a rotating spindle of a disk drive system which passes through a central portion of the center core during writing or readout of information. The spindle is rotated at a high speed. The central portion of the inner surface of the casing which abuts against the tip of the spindle rotating at a high speed is provided with a wear-resistant member in order to prevent wear thereof.

The wear-resistant member is stamped out in a predetermined shape from a sheet composed of a material such as ultra-high-molecular-weight polyethylene and, conventionally is bonded to the inner surface of the casing by use of a double-coated adhesive tape. However it is very difficult to stamp out the wear-resistant members from a sheet lined with the double-coated adhesive tape because the release paper which covers the adhesive tape tends to slip as the sheet is stamped, e.g., the double-coated adhesive tape is apt to peel off the wear-resistant member, which leads to a deterioration of the yield and an increase in the manufacturing cost.

SUMMARY OF THE INVENTION

In view of the foregoing observations and description, the primary object of the present invention is to provide a method of assembling a magnetic disk cartridge in which the formation of the wear-resistant member can be facilitated, whereby the manufacturing cost of the magnetic disk cartridge can be reduced.

Another object of the present invention is to provide a system for carrying out the method.

The method of the present invention comprises the steps of applying a heat-sensitive adhesive to one side of a raw sheet material made up of the same material as wear-resistant members, cutting the raw sheet material into wear-resistant members, heating each of the wear-resistant members in order to melt the heat-sensitive adhesive while supporting the wear-resistant member with a suction force, releasing the wear-resistant member while the heat-sensitive adhesive is in a molten state, and applying the wear-resistant member to the central portion of the inner surface of the casing.

The system of the present invention comprises a cutting means for cutting a raw sheet material composed of the same material as the wear-resistant members, and provided with a heat-sensitive adhesive on one side thereof into wear-resistant members, a heating/supporting means for heating each of the wear-resistant members in order to melt the heat-sensitive adhesive while supporting the wear-resistant member with a suction force, a support table which supports the casing at a position below the position of the wear-resistant member when it is supported by the heating/supporting means, and an applicator which presses the wear-resistant member against the central portion of the inner surface of the casing, thereby applying the former to the latter.

As the heat-sensitive adhesive, ethylene-vinyl acetate copolymer adhesive is typically used. The ethylene-vinyl acetate copolymer adhesive requires heating at about 80° C. for about 0.8 seconds to exhibit a desired bonding force.

In accordance with the present invention, each wear-resistant member can be easily cut from the raw sheet material when compared with the conventional method in which each wear-resistant member is stamped out from a raw sheet material lined with a double-coated adhesive tape and covered with a release paper. This leads to 70 to 80% cost reduction as compared with the conventional method. Further since the heat-sensitive adhesive is melted immediately before it is applied to the casing while the wear-resistant member is supported with a suction force, the cutting means cannot be contaminated by the heat-sensitive adhesive.

DESCRIPTION OF THE PREFERRED EMBODIMENT

Figure 1:
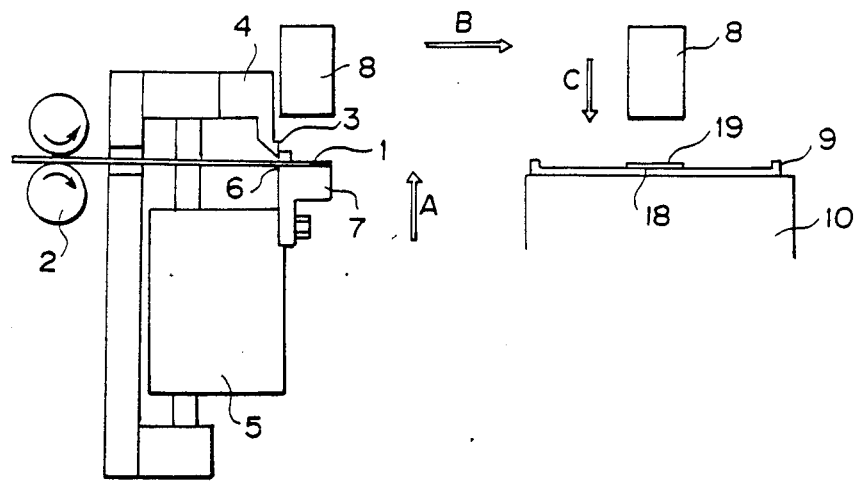
FIG. 1 is a schematic view of a magnetic disk cartridge assembling system in accordance with an embodiment of the present invention.

In FIG. 1, a magnetic disk cartridge assembling system in accordance with an embodiment of the present invention includes a pair of conveyor rollers 2 which intermittently conveys a raw sheet material 1 of wear-resistant members, the lower sides of which have a heat-sensitive adhesive applied thereto, an upper cutter 4 having an upper blade 3 positioned near the upper side of the sheet material 1, and a lower cutter 7 which has a lower blade 6 and is moved up and down by an up-and-down mechanism 5. The raw sheet material 1 is made of ultrahigh-molecular-weight polyethylene, for instance. The lower blade 6 is moved up and down together with the lower cutter 7. When the lower blade 6 is moved upward (in the direction of arrow A), it works in association with the upper blade 3, and the sheet material 1 is cut into wear-resistant members. As will be described in detail later, the lower cutter 7 holds the leading end portion of the sheet material 1 with a suction force when cutting the sheet material 1 into the wear-resistant members. A heating/supporting head 8 receives the wear-resistant member from the lower cutter 7, and while supporting it with a suction force heats it so that the heat-sensitive adhesive will melt. The heating/supporting head 8 is moved in the direction of arrow B and is moved downward in the direction of arrow C until it presses the wear-resistant member 19 against a predetermined central portion of a cartridge casing 9 located on a support table 10. Thereafter, the heating/supporting head 8 releases the wear-resistant member 19. Each wear-resistant member cut from the sheet material 1 is thus applied to the casing 9. The conveyance of the sheet material 1 by the conveyor rollers 2 and the up-and-down movement of the lower cutter 7 are synchronized with each other. That is, when the lower cutter 7 is in the lowermost position, the conveyor rollers 2 convey the sheet material 1, and when the lower cutter 7 is moved up and down, the conveyor rollers 2 do not convey the sheet material 1.

Figure 2:
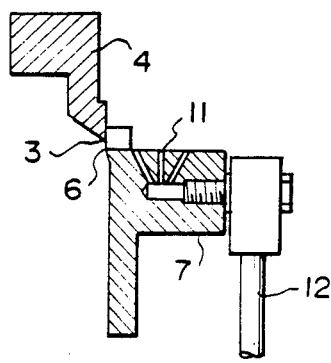
FIG. 2 is a fragmentary cross-sectional view showing a part of the system.

As shown in FIG. 2, the lower cutter 7 is provided with a plurality of suction holes 11 on the upper surface thereof. The suction holes 11 are connected to a suction source (not shown) by way of piping 12. When the leading end portion of the sheet material 1 is conveyed across the upper surface of the lower cutter 7 and stopped there, a suction force is fed to the suction holes 11 to keep the leading end portion of the sheet material 1 positioned on the upper surface of the lower cutter 7. The suction force is fed to the suction holes 11 until the lower cutter 7 delivers the wear-resistant member 19 to the heating/supporting head 8. With this arrangement, the wear-resistant member 19 can be smoothly delivered to the heating/supporting head 8 and can be correctly positioned with respect to the heating/supporting head 8 and accordingly to the casing 9 on the support table 10.

When it is cut by the upper and lower cutters 4 and 7, the heat-sensitive adhesive applied to the sheet material 1 cannot stick to the upper blade 3, the lower blade 6, the upper surface of the lower cutter 7 or the like since the heat-sensitive adhesive is not melted at this time.

Figure 3:
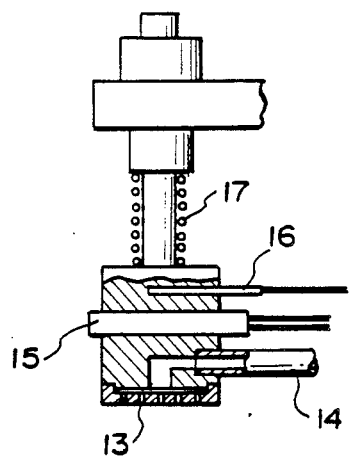
FIG. 3 is a fragmentary cross-sectional view showing another part of the system.

As shown in FIG. 3, the heating/supporting head 8 is provided with a plurality of suction holes 13 on the lower surface thereof. The suction holes 13 are connected to a suction source (not shown) by way of piping 14, and when the suction force is fed to the suction holes 14, the wear-resistant member 19 on the upper surface of the lower cutter 7 is attracted to the lower surface of the heating/supporting head 8 with the side on which the heat-sensitive adhesive is applied facing downward. The heating/supporting head 8 is further provided with an electric heater 15 above the suction holes 13 and with a thermocouple 16 above the heater 15. The heater 15 heats the wear-resistant member on the heating/supporting head 8 in order to melt the heat-sensitive adhesive borne on the wear-resistant member before the wear-resistant member is pressed against the casing 9. The thermocouple 16 is for controlling the heater 15 so that the heat-sensitive adhesive is melted in an optimal state.

The heating/supporting head 8 is resiliently supported by use of a spring 17 so that the wear-resistant member can be resiliently pressed against the inner surface of the casing 9. The suction force fed to the suction holes 13 is turned off in response to the pressing of the wear-resistant member against the casing 9.

Figure 4:
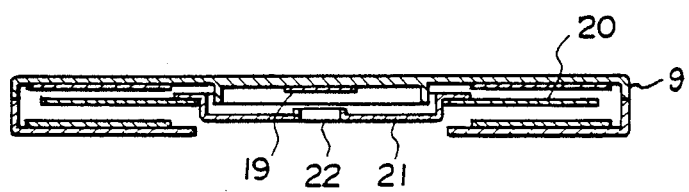
FIG. 4 is a cross-sectional view showing a magnetic disk cartridge assembled by the system shown in FIG. 1.

The magnetic disk cartridge having the wear-resistant member thus applied to the inner surface of the casing 9 is shown in FIG. 4. A magnetic disk sheet 20 having a center core 21 is accommodated in the casing 9 in such a way that it may be rotated. The center core 21 has a center hole 22 and the rotating spindle of a disk drive system is inserted into the center hole 22. The tip of the spindle abuts against the wear-resistant member 19. The wear-resistant member 19 protects the inner surface of the casing 9 from being damaged by the tip of the spindle when the spindle rotates at a high speed.

The heat-sensitive adhesive may be applied to the sheet material 1 in various manners. For example, it may be applied by use of a roll coater. Further, it may be applied manually or by use of an automated system.

The system of the present invention need not be limited to the illustrated embodiment but various modifications can be applied thereto. For example, a plurality of wear-resistant members may be cut from the sheet material at one time and may be applied to a plurality of casings at one time by use of a plurality of heating/supporting heads.

What is claimed is:

1. A method of assembling a magnetic disk cartridge comprising a magnetic disk sheet accommodated in a casing in such a way that it may be rotated, said casing having a wear-resistant member applied to a central portion of the inner surface thereof, the method comprising steps of
    applying heat-sensitive adhesive to one side of a raw sheet material composed of the same material as the wear-resistant member,
    cutting the raw sheet material into wear-resistant members,
    heating each wear-resistant member in order to melt the heat-sensitive adhesive while supporting the wear-resistant member with a suction force,
    releasing the wear-resistant member while the heat-sensitive adhesive is in a molten state, and
    applying the wear-resistant member to the central portion of the inner surface of the casing.

2. A system for assembling a magnetic disk cartridge comprising a magnetic disk sheet accommodated in a casing in such a way that it may be rotated, said casing having a wear-resistant member applied to a central portion of the inner surface thereof, the system comprising
    a cutting means for cutting a raw sheet material, which is composed of the same material as the wear-resistant member and provided with heat-sensitive adhesive on one side thereof, into wear-resistant members,
    a heating/supporting means for heating each wear-resistant member in order to melt the heat-sensitive adhesive while supporting the wear-resistant member with a suction force,
    a support table which supports the casing at a position below the position of the wear-resistant member when it is supported by the heating/supporting means,
    and an applicator means which presses the wear-resistant member against the central portion of the inner surface of the casing, thereby applying the former to the latter.

* * * * *